United States Patent [19]

Ohyama

[11] Patent Number: 5,322,993
[45] Date of Patent: Jun. 21, 1994

[54] TILT-ERROR DETECTOR

[75] Inventor: Minoru Ohyama, Sagamihara, Japan

[73] Assignee: Victor Company of Japan, Ltd., Yokohama, Japan

[21] Appl. No.: 23,070

[22] Filed: Feb. 25, 1993

[30] Foreign Application Priority Data

Feb. 29, 1992 [JP] Japan .................................. 4-079381

[51] Int. Cl.$^5$ .................................................. G11B 7/12
[52] U.S. Cl. ..................................... 369/118; 369/119; 369/44.24
[58] Field of Search ............... 369/118, 119, 112, 114, 369/120, 54, 58, 44.32, 44.23, 44.24

[56] References Cited

U.S. PATENT DOCUMENTS 4,534,021  8/1985  Smith .................................. 369/119
4,782,474  11/1988  Arai et al. ......................... 369/119

OTHER PUBLICATIONS

Japanese Laid Open Patent Application No. 137831/1991, published on Jun. 12, 1991.
Japanese Laid Open Utility Model Application No. 135817/1985, published on Sep. 9, 1985.
Japanese Laid Open Patent Application No. 44531/1990, published on Feb. 14, 1990.

Primary Examiner—Paul M. Dzierzynski
Assistant Examiner—Kiet T. Nguyen
Attorney, Agent, or Firm—Michael N. Meller

[57] ABSTRACT

Tilt error detecting apparatus detects a surface tilt of a disc (26) and produces a tilt-error signal (TE) for servo control of optical pickup which is to follow the surface tilt. The apparatus has a movable portion (B) carrying an objective lens (16) for writing/reading optical information on/from a recording surface (26A) of the disc and a mirror (52) or a semi-transparent mirror (24) movable together with the objective lens, and a stationary portion (A) carrying a light beam source (10, 12, 14, 22, 50) for projecting a detection beam ($LC_1$) to the recording surface through the mirror. The detection beam is reflected at the mirror like recording surface and forms a reflected beam ($LC_2$). Aperture is provided on the stationary portion for passing a part of the reflected beam, the partly passed reflected beam is projected on a detector which produces the tilt-error signal depending on a position of a beam spot ($LC_3$) produced thereon by the partly passed reflected beam. In one of the two embodiments, the semi-transparent mirror (24) directs the reflected beam toward the aperture.

2 Claims, 6 Drawing Sheets

TILT-ERROR DETECTOR

FIELD OF THE INVENTION

The present invention relates to an optical pickup for recording/reproducing information on/from an optical disc such as compact discs (CD) or laser discs (LD) and, particularly, to an improvement of a tilt-error detector for detecting a fluctuation of surface-tilt of an optical disc.

DESCRIPTION OF THE RELATED ART

It is well known as disclosed in, for example, Shigeo Kubota's article "Jitter Analysis of Eye-Pattern in Optical Disc", Kogaku (OPTICS), No. 12 (1983), pp 437, that, when a disc is tilted with respect to an optical axis of an optical pickup in an optical disc system for CD or LD, coma develops causing performance of the system to be degraded by jitter or a cross talk, etc. In order to avoid such problem, a so-called tilt servo control system for controlling an optical pickup in response to a tilting of the optical pickup has been proposed and used practically in some devices.

Figure 1:
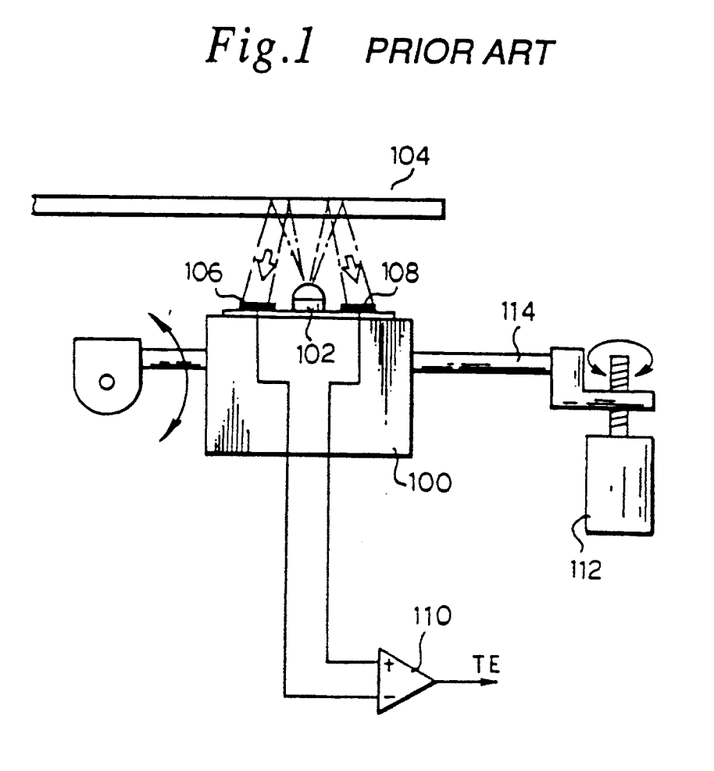
FIG. 1 shows a first conventional tilt error detector schematically.

FIG. 1 shows an example of a conventional tilt detector used in such a tilt servo control system. In FIG. 1, light emitted from a light emitting diode (referred to as LED hereinafter) 102 incorporated in an optical pickup 100 is reflected by a light reflecting surface of a disc 104 and falls on photo-detectors 106 and 108 arranged on both sides of the LED. When the disc 104 tilts, amounts of light incident on the respective photo detectors 106 and 108 become different each other. Accordingly, a tilt error signal TE is generated by differentiating outputs of the photo detectors 106 and 108 by means of a differential amplifier 110.

In the example shown in FIG. 1, a tilt motor 112 is driven by the tilt error signal TE and one end of a guide rail 114 is rotated vertically with a rotation of the motor 112 to change a tilt of the optical pickup 100, so that a relative tilt angle of the optical pickup 100 with respect to the disc 104 is kept substantially constant. (e.g. "Laser Disc Technical Manual Book", edited by Pioneer Electric Corp., published by ASCII Publishing, 1986, pp 97).

Figure 2:
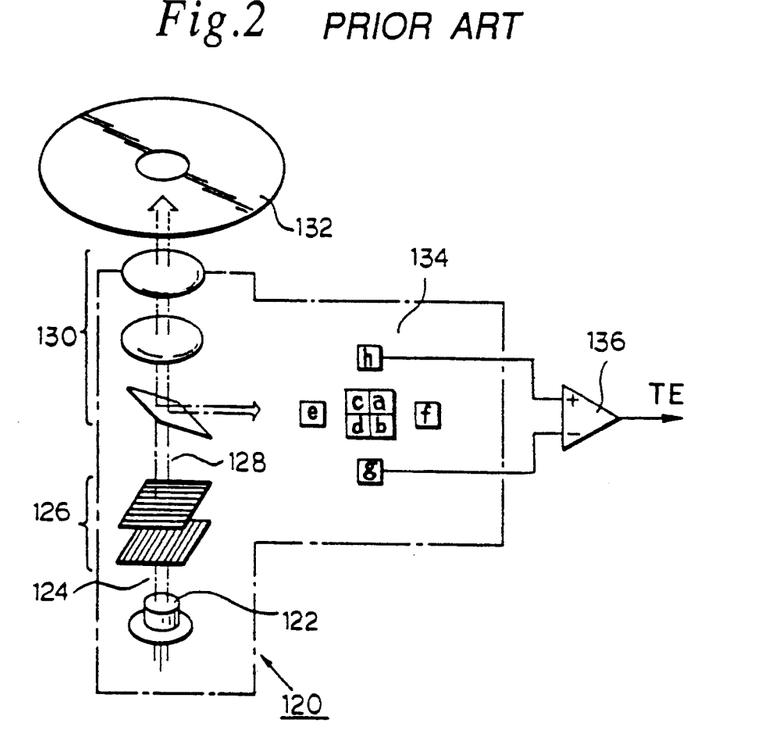
FIG. 2 shows a second conventional tilt error detector schematically.

FIG. 2 shows another conventional system which is disclosed in Japanese Patent Application Laid open No. 3-37837 (1991). In this example, a laser beam 124 emitted from a laser 122 of an optical pickup 120 for reading information is also used for a tilt detection. The laser beam 124 is diffracted by a diffraction grating 126 and resultant [0 and +1st order], and [0 and −1st order] diffracted lights are used as tilt beams 128. These tilt beams 128 are directed to a disc 132 through a projection optical system 130 including semitransparent mirrors and objective lens, etc., and these beams reflected by the disc 132 travel in substantially opposite direction in the projection optical system 130 and fall on elements h and g of an 8-division optical detector 134, respectively.

When the disc 132 tilts, the [0 and +1st order] tilt beam and [0 and −1st order] tilt beam are partially cut-off by an entrance pupil of the objective lens of the projection optical system 130, respectively, at different rates. Therefore, there is a difference in light amount between the tilt beams 128 incident to the elements h and g of the 8-division optical detector 134. By obtaining a difference between photoelectric conversion outputs of these elements h and g by means of a differential amplifier 136, a tilt error signal TE similar to that described with reference to the former example is obtained.

In these examples, since the tilt error detecting system is mounted on a body of the optical pickup 100 or 120, only a relative tilt between the optical pickup and the disc can be detected and, therefore, a tilt control is limited to move the entire body of the optical pickup. Thus, a mass of a movable body, in other words, an inertia thereof in the tilt control system is inherently large. Due to such large inertia, the system becomes practically inoperative in high frequency although it is usable in a low frequency range such as control of a surface tilt caused by hang down of a peripheral portion of an optical disc in which a required response time is as long as several seconds.

In a high density disc system, a use of an objective lens having numerical aperture NA as large as about 0.6 has been proposed. In such a case, a tolerance of disc tilt is severely limited to about 0.2 degrees. In the conventional tilt control systems described before, it is impossible to respond to a tilt variation caused by deformation of a disc, at a frequency equal to or higher than a frequency of rotation of the disc. Therefore, it is impossible to prevent coma from being produced when an objective lens having such a large numerical aperture.

Figure 3:
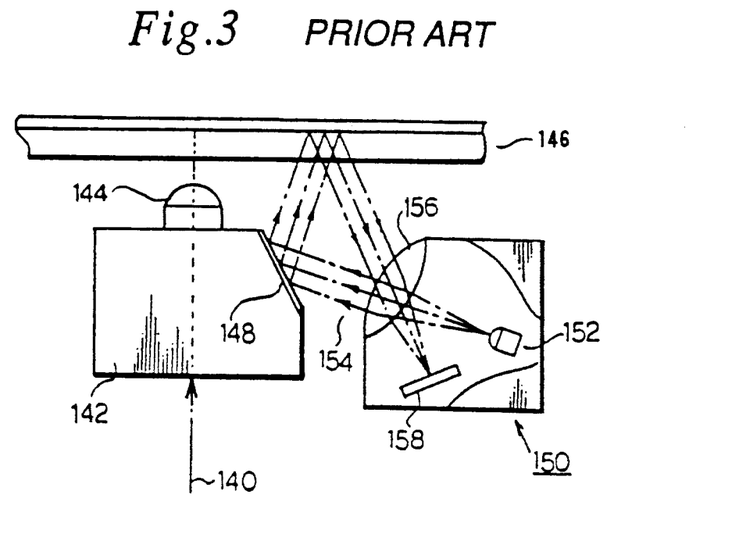
FIG. 3 shows a third conventional tilt error detector schematically.

In order to solve this problem, Japanese Patent Application Laid open No. 3-137831 (1991) discloses a system in which a portion of an optical system of a pickup is made possible to tilt. FIG. 3 shows such a system schematically. In FIG. 3, laser beam 140 for recording/reproducing information is directed to a disc 146 through a convergent lens 144 mounted on a lens holder 142. A mirror 148 is provided on a side surface of the lens holder 142 and supported by a voice coil (not shown) so that an entire body of the lens holder 142 can tilt and move.

A tilt error detector 150 is provided separately from the lens holder 142 and tilt error detection beam 154 emitted from a light source 152 is directed to the mirror 148 on the lens holder 142 through a collimator lens 156 for rendering parallelism of light. The detection beam 154 reflected by the mirror 148 is further reflected by the disc 146 and directed to a 4-division optical detector 158 through the collimator lens 156.

In this case, when the disc 146 tilts, an incident point of the detection beam 154 on the 4-division optical detector 158 is changed corresponding to an amount of the tilt. The change of incident point can be obtained as a tilt error signal by differentiating intensities of light incident to four detector elements of the 4-division optical detector 158. The tilt error signal is supplied to the voice coil supporting the lens holder 142, so that only the lens holder 142 is moved to correct the disc tilt.

In this conventional system where only the lens holder 142 holding the convergent lens 144, instead of the whole pickup, is movable, it is possible to respond to a high frequency tilt.

However, in this system, it is necessary to provide additionally the light source 152 and the collimator lens 156 for the tilt error detection. Further, when the optical detector 158 is not exactly placed on a focal plane of the detection beam 154, there may be a shift of the incident point of the detection beam 154 due to an attitude change of the lens holder 142 holding the convergent lens 144 as it displaces for focusing or tracking even if there is no tilt of the disc 146, so that is possible to generate a false tracking error signal. Therefore, the positioning of the optical detector 158 is quite critical and requires a very high precision.

In the conventional systems, the control is performed by tilting a part or a whole optical system with respect to a disc, however, it has been known that, in view of optical aberration, substantially the same effect is obtained by making an optical system stationary and tilting only an objective lens responding to a tilt of a disc.

According to the present invention, reflection mirror which can tilt and move together with an objective lens is provided and a tilt detection beam is reflected by the mirror and a disc. The reflected tilt detection beam is restricted by means of an aperture device and inputted to a signal detector. The aperture device serves to prevent an erroneous detection when the objective lens and the disc are tilted in the same direction by the same amount, that is, when there is no relative tilting therebetween. A tilting control is performed by using a tilt error signal produced from the signal detector in the above arrangement. Since the movable member is only the objective lens and the reflection mirror, a moving mass is substantially reduced, allowing a tilt servo operation in a high frequency range higher than a frequency of disc rotation.

SUMMARY OF THE INVENTION

Therefore, an object of the present invention is to provide a tilt error detector for detecting tilt error, which has a simple construction and is insensitive to positional change of an objective lens during operation for focusing and tracking.

Another and more specific object of the present invention is to provide a tilt error detecting apparatus for detecting a surface tilt of a disc and producing a tilt-error signal responsive to the surface tilt for servo controlling an attitude of optical pickup to follow variations of the surface tilt of a disc. Such apparatus comprises a movable portion carrying an objective lens for writing/reading optical information on/from a recording surface of the disc and a mirror movable together with the objective lens, and a stationary portion disposed adjacent to the movable portion, carrying a light beam projecting device for projecting a detection beam to the recording surface through the mirror. After passing through the mirror, the detection beam is reflected at the recording surface and forms a reflected beam. Aperture is provided on the stationary portion allowing to pass a part of the reflected beam, a detecting device is further provided on the stationary portion for producing the tilt-error signal depending on a position of a beam spot produced on the detecting device by the reflected beam partly passed through the aperture and incident on the detecting device, the mirror may be arranged to direct the reflected beam toward the aperture.

Other objects and further features of the present invention will be apparent from the following detailed description with respect to preferred embodiments of the invention when read in conjunction with the accompanying drawings.

DETAILED DESCRIPTION OF THE PREFERRED EMBODIMENTS

Embodiments of a tilt error detector according to the present invention will be described with reference to the accompanying drawings.

First Embodiment

Figure 4:
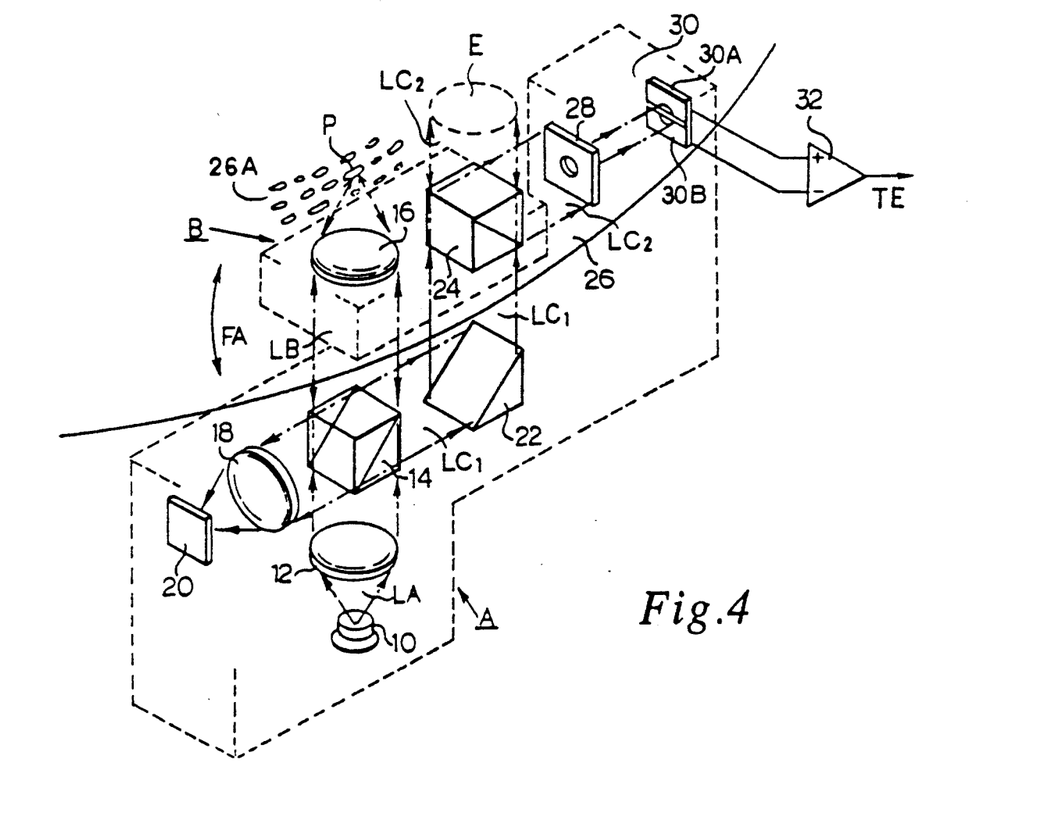
FIG. 4 is a perspective view of a first embodiment of a tilt error detector according to the present invention.
Figure 5:
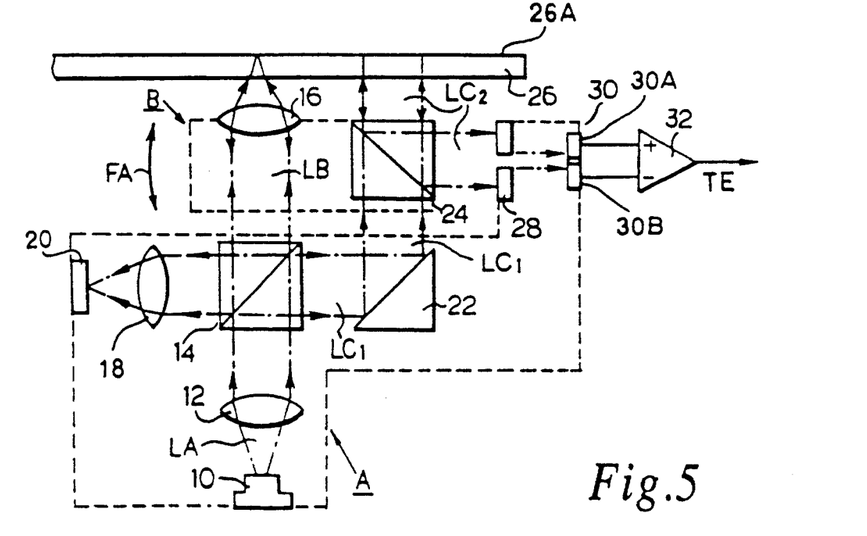
FIG. 5 is a side view of the first embodiment.
Figure 6:
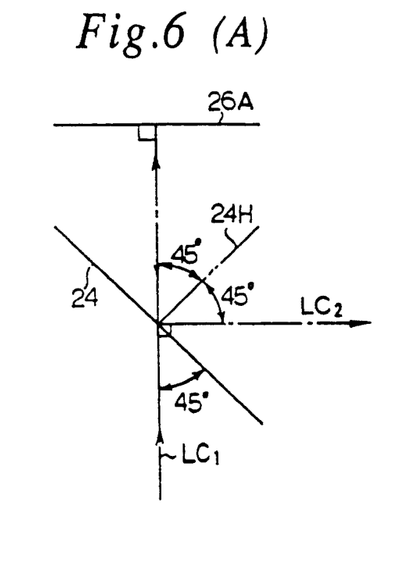
FIGS. 6(A), 6(B), 6(C) and 6(D) show a relation between a tilt of a semi-transparent mirror, a tilt of a disc and a detection beam in the first embodiment.
Figure 7:
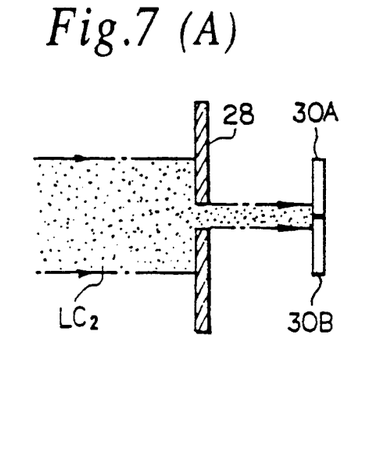
FIGS. 7(A), 7(B), 8(A), 8(B), 9(A) and 9(B) show an effect of an aperture device in the first embodiment.
Figure 8:
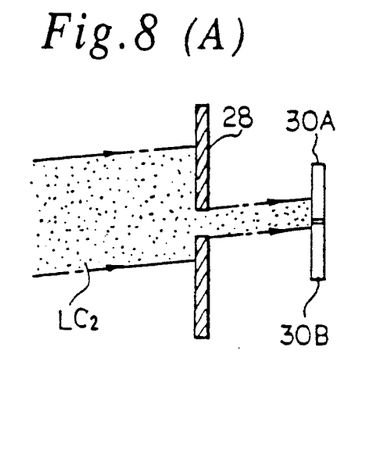
Figure 9:
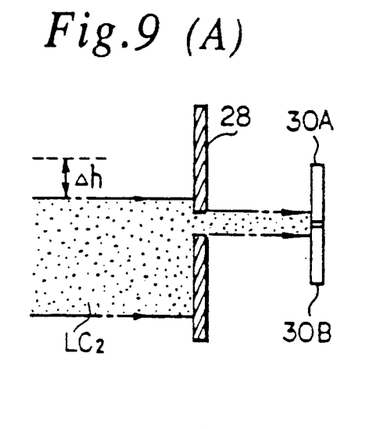

A first embodiment will be described first with reference to FIGS. 4 through 9(B). FIG. 4 is a perspective view of a main portion of the first embodiment and FIG. 5 is a side view thereof. In FIGS. 4 and 5, an optical pickup is composed of a main body A and a rocking portion (tilt actuator) B which performs rocking motion. A semiconductor laser 10 is disposed on a bottom portion of the main body A and a collimator lens 12 and a semi-transparent mirror 14 are arranged in an optical path of laser beam LA emitted from the laser 10 in the order. An objective lens 16 of the rocking portion B is arranged opposite to the semiconductor laser 10 with respect to the semi-transparent mirror 14.

A detection lens 18 and optical detector 20 are arranged horizontally on one side of the semi-transparent mirror 14 and a mirror 22 is arranged horizontally on the other side of the semi-transparent mirror 14. A semi-transparent mirror 24 of the rocking portion B is arranged between the mirror 22 and a disc 26. An aperture member 28 and an optical detector 30 are arranged horizontally on a reflection side of the semi-transparent mirror 24 in the order. As shown in FIG. 5, the optical detector 30 is spaced from the aperture member 28 at a certain distance, and the aperture member 28 is disposed in an optical path between a recording surface 26A of the disc 26 and the the optical detector 30. A differential amplifier 32 is connected to the optical detector 30.

The laser beam LA from the semiconductor laser 10 is divided by the semi-transparent mirror 14 to a main beam LB and a detection beam $LC_1$. The main beam LB is directed to a pit train (FIG. 4) formed on the recording surface 26A through the objective lens 16 and reflected back thereby. The reflected main beam LB is subsequently reflected by the semi-transparent mirror 14 and directed to the optical detector 20 through the detection lens 18. Recording/reproducing of data and detection of focusing error/tracking error for the disc 26 are performed by a known method using the main beam LB.

On the other hand, the detection beam $LC_1$ is reflected by the mirror 22 and directed through the semi-transparent mirror 24 to a relatively large area E on the recording surface 26A which is practically a mirror surface thus is very reflective optically (FIG. 4). A reflected beam $LC_2$ reflected back from the area E is subsequently reflected by the semi-transparent mirror 24 and directed to the optical detector 30 through the aperture member 28. The area E is defined on the recording surface 26A by being irradiated by the detection beam $LC_1$.

The rocking portion B including the objective lens 16 and the semi-transparent mirror 24 can tilt and move as shown by a double headed arrow FA in FIG. 4 so that a tilt, as viewed in FIG. 5, of the main beam LB with respect to a tangential of the pit train on the recording surface 26A can be controlled by a feedback servo based on a tilt error signal TE outputted from the differential amplifier 32.

The aperture member 28 arranged in the optical path of the reflected beam $LC_2$ allows to pass a portion of incident reflected beam $LC_2$ so that a tilt error detection is still possible even when the incident reflected beam $LC_2$ is displaced its position in parallel (vertical in FIG. 5). The optical detector 30 is composed of two detecting element halves 30A and 30B.

An operation of the embodiment constructed as mentioned in the foregoing will be described with reference to FIGS. 6(A) through 9(B) in addition to FIGS. 4 and 5. The laser beam LA emitted by the semiconductor laser 10 is collimated by the collimator lens 12 and directed to the semi-transparent mirror 14. The main beam LB passed through the semi-transparent mirror 14 is collected by the objective lens 16 and directed to the disc 26 to form a minute spot on the recording surface 26A of the disc 26.

The main beam LB reflected back from the recording surface 26A is directed to the semi-transparent mirror 14 through the objective lens 16 and reflected thereby to the optical detector 20 through the detection lens 18. The optical detector 20 converts it into electrical signals from which a data read signal, a focus error signal and a tracking error signal with respect to the pit train on the disc 26 are produced by known technology.

On the other hand, the detection beam $LC_1$ reflected by the semi-transparent mirror 14 is further reflected by the mirror 22 at a right angle and directed to the disc 26 through the semi-transparent mirror 24. The reflected beam $LC_2$ reflected from recording surface 26A is further reflected by the semi-transparent mirror 24 and directed to the 2-division optical detector 30 through the aperture member 28. As it passes through the aperture member 28, a cross sectional area of the reflected beam $LC_2$ is limited to a fraction of an original sectional thereof.

The detection element halves 30A and 30B transform the incident light into electric signals which are inputted to the differential amplifier 32 and processed therein. For example, the differential amplifier 32 subtracts the signal from the detection element half 30B from the signal from the detection element half 30A and outputs the difference as the tilt error signal TE. The tilt control of the rocking portion B is performed on the basis of the tilt error signal TE.

The tilt error detection using the detection beam $LC_1$ will be described in more detail. FIG. 6(A) to FIG. 6(D) show an optical system for the detection and reflected beams $LC_1$ and $LC_2$ between the mirror 22 and the aperture member 28 schematically. It is assumed that the optical system shown in FIG. 6(A) represents a reference status of the optical system when there is no variation of tilt between the optical pickup and the disc. That is, the recording surface 26A holding the pit train on the disc 26, is perpendicular to an optical axis of the objective lens 16 and to an optical axis of the detection beam $LC_1$ advancing toward the disc 26 and the semi-transparent mirror 24 is disposed at 45° with respect to the optical axis of the detection beam $LC_1$. In FIG. 6(A), 24H indicates a normal to a surface of the semi-transparent mirror 24.

In this state, an incident angle of the reflected beam $LC_2$ incident to the semi-transparent mirror 24 is 45° and a reflection angle of the reflected beam $LC_2$ at the semi-transparent mirror 24 is 45°. That is, an optical axis of the reflected beam $LC_2$ directed to the aperture member 28 is at 90° with respect to the optical axis of the detection beam $LC_1$ directed to the disc 26. Variations from this reference status caused by a tilt of the recording surface 26A will be described, considering only components of angular variation of the respective elements in the plane of the drawing sheet.

In case where the recording surface 26A tilts from the reference status shown in FIG. 6(A) in counterclockwise direction by an angle $\theta$, the optical system becomes as shown in FIG. 6(B). In FIG. 6(B), a dotted line shows the recording surface 26A in FIG. 6(A) as a reference. As will be clear from FIG. 6(B), the optical axis of the reflected beam $LC_2$ directed to the aperture member 28 is changed in clockwise direction by $2\theta$. In case where the semi-transparent mirror 24 is tilted counterclockwise direction or the disc 26 tilts clockwise direction from the reference status shown in FIG. 6(A) by an angle $\psi$, it becomes as shown in FIG. 6(C). In this case, the optical axis of the reflected beam $LC_2$ directed to the aperture member 28 is changed in counterclockwise direction by $2\psi$.

In a case where the tilt of the recording surface 26A shown in FIG. 6(B) and the tilt of the semi-transparent mirror 24 shown in FIG. 6(C) occur simultaneously and the tilts are $\theta$ respectively, the optical system becomes as shown in FIG. 6(D). That is, the angular change of the optical axis of the reflected beam $LC_2$ directed to the aperture member 28 is cancelled out while a reflection point on the semi-transparent mirror 24 is shifted in vertical distance by $\Delta h$ with respect to that shown in FIG. 6(A).

Thus, in the case where the semi-transparent mirror 24 and the disc 26 are tilted in the same direction by the same angle, that is, where the whole optical system shown in FIG. 6(A) is tilted together, there is no angular change although a parallel displacement of the reflected beam $LC_2$ directed to the aperture member 28 occurs. Therefore, by detecting an angular change of the reflected beam $LC_2$ incident on the aperture member 28, it is possible to detect a relative tilt angle of the semi-transparent mirror 24 with respect to the disc 26 i.e. the recording surface 26A.

The detection of the relative tilt angle will be described with reference to FIGS. 7(A) to 9(B). The pupil of the aperture member 28 is set to a fraction of the original cross sectional area of the reflected beam $LC_2$ as mentioned previously. Further, a dividing line between the detection element halves 30A and 30B of the optical detector 30 is set such that the reflected beam $LC_2$ passed through the aperture member 28 forms a spot $LC_3$ on the detection element halves 30A and 30B irradiating them equally when there is no relative tilt between the semi-transparent mirror 24 and the disc 26 as shown in FIG. 6(A) or FIG. 6(D).

In the reference status shown in FIG. 6(A), the reflected beam passed through the aperture member 28 falls equally on the detection element halves 30A and 30B of the optical detector 30 as shown in FIGS. 7(A) and 7(B). Therefore, outputs Ia and Ib of the respective detection element halves 30A and 30B are equal to each other and the tilt error signal TE outputted by the differential amplifier 32 is $Ia-Ib=0$.

In the state shown in FIG. 6(C), the spot $LC_3$ formed by the reflected beam $LC_2$ passing through the aperture member 28, is displaced up to the detection element half 30A as shown in FIGS. 8(A) and 8(B). This causes, $Ia>Ib$ and the tilt error signal TE becomes $Ia-Ib>0$. Similarly, in the state shown in FIG. 6(B), the spot $LC_3$ formed by the reflected beam $LC_2$ passed through the aperture member 28, is displaced down to the detection element half 30B, causing the tilt error signal TE to be $Ia-Ib<0$.

In the state shown in FIG. 6(D), although the reflected beam $LC_2$ directed to the aperture member 28 is displaced by $\Delta h$ vertically, the spot $LC_3$ stays on the detection element halves 30A and 30B covering equally as shown in FIGS. 9(A) and 9(B), unless the reflected beam $LC_2$ miss the aperture of the aperture member 28. Therefore, the tilt error signal TE produced from of the differential amplifier 32 is not affected by such displacement.

Thus, the tilt error signal TE produced from the differential amplifier 32 is provided responsive to a relative tilt between the semi-transparent mirror 24 and the recording surface 26A. Since the semi-transparent mirror 24 is provided integrally with the objective lens 16 in the rocking portion B, the relative tilt between the semi-transparent mirror 24 and the recording surface 26A is equivalent to the relative tilt between the objective lens 16 and the disc 26.

Therefore, even if the objective lens 16 is moved for focusing or tracking, there is no tilt error signal TE produced thereby unless any relative tilt occurs between the recording surface 26A and the objective lens 16. In other words, only a relative tilt error between the objective lens 16 and the recording surface 26A is efficiently detected without being influenced by a tilt of the optical axis in the main body A and/or displacement of the objective lens 16 due to focusing and/or tracking operation.

The tilt error signal TE thus obtained is fed back to the rocking portion B to perform a tilt servo control so as to cause the tilt error signal TE to become 0 so that the relative positions between the objective lens 16 and the disc 26 is controlled to assume the reference status shown in FIG. 6(A) or FIG. 6(D) and an inclination of the objective lens 16 follows a tilt of the disc 26.

As described, the first embodiment of the present invention provides such effects as below:

(1) The detecting portion for producing the tilt error signal TE is constituted with the aperture member 28 and it does not require any specific lens element. Further, since the aperture member 28 can be formed simply by providing a hole in a pickup base, it is inexpensive.

(2) Since the detection beam $LC_1$ is branched from the laser beam LA, there is no need of preparing any additional light source for the purpose of tilt error detection. Particularly, a semi-transparent mirror (14) or a beam splitter is usually used in an optical pickup and a reflection therefrom is wasted. In the present invention such reflection is effectively utilized.

(3) Thanks to the use of the aperture member 28, the reflected beam $LC_2$ can be parallel beam. Further, the present invention is not affected by positional displacement of the objective lens 16 caused by focusing and/or tracking operation even if the optical detector 30 is displaced along an optical axis of the reflected beam $LC_2$, with minimum change of error detection sensitivity.

(4) With the use of the semi-transparent mirror 24, the optical path configuration within the system becomes simple and clear, resulting in easy assembling/alignment and compactness of the system.

(5) Since it is possible to detect a relative tilt between the objective lens 16 and the recording surface 26A regardless of tilt of the pickup body, a response characteristics of the tilt control system can be improved by constituting the movable portion with only the objective lens 16 and the semi-transparent mirror 24. For this reason, it is possible to substantially reduce coma to be produced by a tilt of disc and to reduce jitter of a reproduced signal from the disc. Further, since it can respond to tilt variation of disc caused by rotation thereof, an objective lens having large numerical aperture NA can be used, meeting the high density disc requirement.

Second Embodiment

Figure 10:
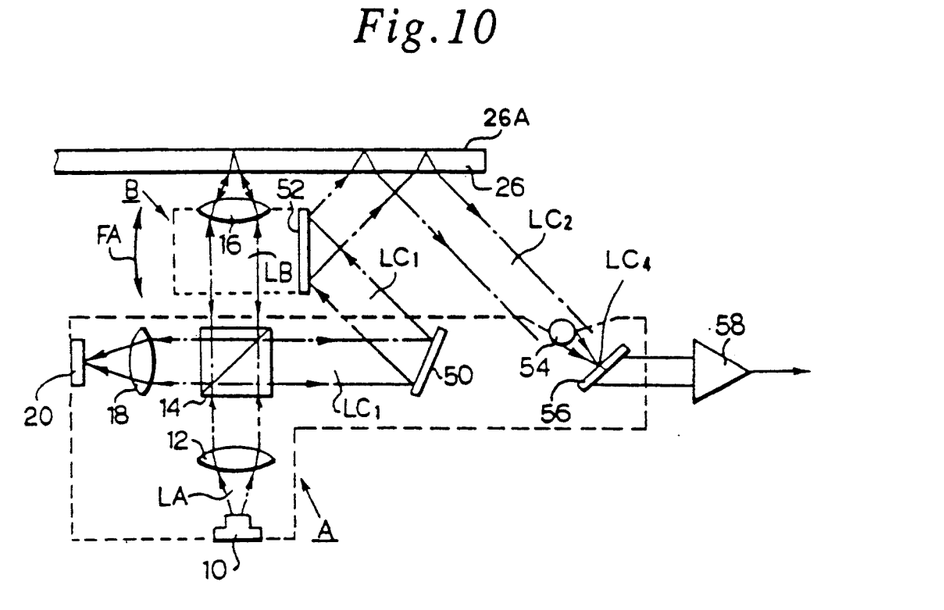
FIG. 10 shows a second embodiment of the present invention.

A second embodiment of the present invention will be described with reference to FIG. 10. In FIG. 10, constitutional components identical to those used in the first embodiment are depicted by identical reference numerals, respectively. In the second embodiment, the mirror 22 and the semi-transparent mirror 24 used in the first embodiment are substituted by a mirror 50 and a full reflective detection mirror 52, respectively. Further, the aperture member 28 in the optical path of the reflection beam $LC_2$ emitted from the disc 26 in the first embodiment is replaced by a ball lens 54 and the optical detector 30 is replaced by a position detector 56. Further, the differential amplifier 32 is replaced by a position detecting operator 58. Other constitutional components than those mentioned above are the same as those of the first embodiment.

According to the second embodiment, the full reflective detection mirror 52 is arranged orthogonally with respect to the recording surface 26A being not tilted, forming a two dimensional corner reflector together with the disc 26. Therefore, the detection beam $LC_1$ incident to the full reflective detection mirror 52 and the reflected beam $LC_2$ from the recording surface 26A are always kept in parallel so long as the relative angle between the recording surface 26A and the full reflective detection mirror 52 is kept 90°.

When a relative tilt occur between the objective lens 16 and the disc 26, with respect to the reference status mentioned before, the parallelism of the beams is broken and a position of the spot $LC_4$ caused by the reflected beam $LC_2$ on the position detector 56, is changed. The positional change is detected by the operator 58, resulting in the tilt error signal TE. In this embodiment, a tilt error alone of the relative tilt between the objective lens 16 and the recording surface 26A is effectively detected without influence of positional displacement of the objective lens 16 caused by focusing/tracking operation.

Other Embodiments

The present invention is not limited to the embodiments described hereinbefore and includes such as follows:

(1) Although, in the first embodiment, the 2-division optical detector 30 is used, a non-division type beam position sensor may be used instead. A lens having a diameter equivalent to the aperture of the aperture member 28, may be used in place of the aperture member 28 or a slit perpendicularly intersecting a displacing locus of the reflected beam $LC_2$ may be used, so long as the reflected beam $LC_2$ incident on the optical detector 30 moves corresponding to a tilt of the optical axis of the reflected beam $LC_2$.

(2) The rocking portion B may be a 3-freedom actuator drivable in three axes of focusing, tracking and tilt by integrating the objective lens 16 and the semi-transparent mirror 24 or the full reflective detection mirror 52. Alternatively, a conventional lens actuator drivable in two axes of focusing and tracking while keeping a tilt of the objective lens 16 constant is used and the semi-transparent mirror 24 or the full reflective detection mirror 52 is mounted on a support member of the actuator so that they can be tilted together. In the latter case, the positional relation between the objective lens 16 and the semi-transparent mirror 24 or the full reflective detection mirror 52 is changed by a servo operation for focusing or tracking. However, as far as the angular relation of them is kept constant by any mechanism, the operation of this invention can be obtained.

(3) Although, in the described embodiments, a tilt with respect to the extending direction (tangential) of the pit train on the recording surface 26A is detected, the same can be applied to radial direction i.e. perpendicular to the tangential of the pit train. Further, it is possible to combine the both. Various modifications are possible with similar effects.

As described hereinbefore, according to the tilt error detector of the present invention in which a mirror is provided integrally with an objective lens of an optical pickup, the detection beam output from a stationary side of the optical pickup is reflected by the mirror and a disc and the reflected beam is detected through an aperture member, it is possible to detect a tilt error effectively by a simple construction without influence of positional displacement of the objective lens due to focusing/tracking operation.

What is claimed is:

1. A tilt error detecting apparatus for detecting a relative angle of a recording surface of a disc with respect to an objective lens of said apparatus and producing a tilt-error signal responsive to said relative angle of said recording surface, said apparatus comprising:

a movable portion carrying said objective lens for respectively writing and/or reading an optical information on and/or from said recording surface and mirror moving means moved together with said objective lens and wherein said movable portion moves relatively said objective lens and said mirror moving means with respect to said relative angle of said surface of said disc;

a stationary portion disposed adjacent to said movable portion, said stationary portion carrying light beam projecting means for projecting a detection beam to said recording surface said detection beam passing through said mirror moving means and being reflected at said recording surface and forming a reflected beam and wherein said projecting means includes a light source means for producing a light beam, collimating means for collimating said light beam, beam splitting means for splitting said light beam into a writing light beam or a reading light beam and said detection beam, mirror means for projecting said detection beam and first detecting means for detecting said writing light beam or said reading light beam reflected from said recording surface and passing through said beam splitting means;

aperture means provided on said stationary portion for passing a part of said reflected beam; and second detecting means provided on said stationary portion for producing said tilt-error signal depending on a position of a beam spot produced thereon by said part of said reflected beam passed through said aperture means and incident on said second detecting means.

2. The tilt error detecting apparatus claimed in claim 1 in which said mirror moving means directs said reflected beam toward said aperture means.

* * * * *